(12) United States Patent
Wang et al.

(10) Patent No.: US 9,400,510 B2
(45) Date of Patent: Jul. 26, 2016

(54) PHASE CHANGE MATERIAL EVAPORATOR CHARGING CONTROL

(71) Applicant: MAHLE International GmbH, Stuttgart (DE)

(72) Inventors: Mingyu Wang, Amherst, NY (US); Prasad Shripad Kadle, Williamsville, NY (US); Edward Wolfe, IV, Clarence Center, NY (US)

(73) Assignee: MAHLE International GmbH, Stuttgart (DE)

( * ) Notice: Subject to any disclaimer, the term of this patent is extended or adjusted under 35 U.S.C. 154(b) by 696 days.

(21) Appl. No.: 13/845,695

(22) Filed: Mar. 18, 2013

(65) Prior Publication Data

US 2013/0248166 A1  Sep. 26, 2013

Related U.S. Application Data

(60) Provisional application No. 61/613,684, filed on Mar. 21, 2012.

(51) Int. Cl.
*G05D 23/19* (2006.01)
*B60H 1/00* (2006.01)
(Continued)

(52) U.S. Cl.
CPC ............... *G05D 23/19* (2013.01); *B60H 1/005* (2013.01); *B60H 1/00828* (2013.01); *F28D 1/0341* (2013.01); *F28D 20/02* (2013.01); *F28F 1/12* (2013.01); *F28D 2020/0008* (2013.01); *F28D 2020/0013* (2013.01); *F28D 2021/0071* (2013.01); *F28D 2021/0085* (2013.01); *Y02E 60/145* (2013.01)

(58) Field of Classification Search
CPC .. F28D 20/028; B60H 1/00492; B60H 1/005; B60H 1/00828; B60H 2001/3261
See application file for complete search history.

(56) References Cited

U.S. PATENT DOCUMENTS 4,964,279 A   10/1990  Osborne
5,277,038 A    1/1994  Carr
(Continued)

FOREIGN PATENT DOCUMENTS

CN     1566382 A       1/2005
EP     1 314 590 A2    5/2003
JP     2007076546 A *  3/2007

OTHER PUBLICATIONS

International Search Report dated Jun. 5, 2013.
(Continued)

*Primary Examiner* — Frantz Jules
*Assistant Examiner* — Nelson Nieves
(74) *Attorney, Agent, or Firm* — Brinks Gilson & Lione

(57) ABSTRACT

An evaporator has a manifold and a plurality of refrigerant tubes extending downward in the direction of gravity from the manifold. The evaporator includes at least one PCM housing engaging the upper portion of the refrigerant tube for storing a phase change material. When operating in a first operating mode, heat is transferred from the phase change material to the refrigerant to freeze and cool the phase change material. When operating in a second operating mode, heat is transferred from the refrigerant to the frozen phase change material to condense the refrigerant. The condensed refrigerant falls downwardly through the tubes and receives heat from a flow of air to cool the air and evaporate the refrigerant. The evaporated refrigerant rises upwardly back to the low pressure of the cold manifold.

8 Claims, 7 Drawing Sheets

(51) Int. Cl.
*F28D 1/03* (2006.01)
*F28D 20/02* (2006.01)
*F28F 1/12* (2006.01)
F28D 20/00 (2006.01)
F28D 21/00 (2006.01)

(56) References Cited

U.S. PATENT DOCUMENTS

| | | |
|---|---|---|
| 5,553,662 A | 9/1996 | Longardner et al. |
| 5,579,830 A | 12/1996 | Giammaruti |
| 6,397,618 B1 | 6/2002 | Chu et al. |
| 6,408,633 B1 | 6/2002 | Carr |
| 6,973,799 B2 | 12/2005 | Keuhl et al. |
| 7,043,931 B2 | 5/2006 | Plummer |
| 7,134,483 B2 | 11/2006 | Barnwell |
| 7,156,156 B2 | 1/2007 | Haller et al. |
| 2002/0134093 A1* | 9/2002 | Aoki ................ B60H 1/005 62/133 |
| 2003/0097852 A1 | 5/2003 | Tomita et al. |
| 2003/0167925 A1* | 9/2003 | Aikawa ........ B60H 1/00492 96/126 |
| 2003/0233835 A1 | 12/2003 | Tomita et al. |
| 2006/0000232 A1 | 1/2006 | Bureau et al. |
| 2007/0251251 A1* | 11/2007 | Wojdyla .............. B60H 1/321 62/180 |
| 2009/0242652 A1* | 10/2009 | Hong ................ B60H 1/3211 236/46 R |
| 2009/0266094 A1 | 10/2009 | Major et al. |
| 2009/0293521 A1* | 12/2009 | Major ................ B60H 1/005 62/228.1 |
| 2011/0067419 A1* | 3/2011 | Aoyagi ............... B60H 1/005 62/133 |
| 2012/0130597 A1* | 5/2012 | Aoyagi ............... B60W 10/06 701/48 |
| 2013/0192271 A1* | 8/2013 | Barnhart ........... B60H 1/00885 62/3.3 |
| 2013/0192272 A1* | 8/2013 | Ranalli ............ B60H 1/00885 62/3.3 |
| 2014/0157802 A1* | 6/2014 | Pebley ............. B60H 1/00828 62/89 |

OTHER PUBLICATIONS

Craig, et al.: "Integrated Air Conditioning Evaporator with Phase Change Material for Thermal Storage"; SAE 10AARS-022. Proceeding of the SAE Alternative Refrigerant and System Efficiency Symposium. 2010, 23 pages.

* cited by examiner

PHASE CHANGE MATERIAL EVAPORATOR CHARGING CONTROL

RELATED PATENT APPLICATIONS

This application claims priority to U.S. provisional application Ser. No. 61/613,684 filed 21 Mar. 2012 entitled "Phase Change Material Evaporator Charging Control". Furthermore, this application is related to application U.S. Ser. No. 12/481,933 filed 10 Jun. 2009 to E. Wolfe IV, et al. entitled "Evaporator Phase Change Thermal Siphon", application U.S. Ser. No. 13/451,665 filed 20 Apr. 2012 to G. Vreeland et al. entitled "Evaporator Phase Change Thermal Siphon" and application U.S. Ser. No. 61/702,889 filed 19 Sep. 2012 to G. Vreeland et al. entitled "PCM Evaporator with Louvered Clam Shells". All three aforesaid related applications are hereby incorporated herein by reference.

TECHNICAL FIELD OF INVENTION

The present invention relates to an evaporator for a vehicle air conditioning system; more particularly, to an evaporator having a phase change material; and still more particularly, to the control of the charging of the phase change material.

BACKGROUND OF THE INVENTION

Hybrid vehicles may employ Belt Alternator Starter (BAS) technology to gain energy efficiency. Coming to a stop at a traffic light or during an extended idle, the engine is turned off to achieve enhanced fuel economy. As the brake pedal is released, an electric motor/generator unit instantaneously restarts the engine, typically in less than half of a second time, making the auto start system essentially transparent to the driver. This is referred to as the Stop-Start strategy for enhancing fuel economy. A BAS vehicle can provide 15-20% fuel economy gain in the city and an overall fuel economy increase of 4~7%. For a baseline gasoline vehicle with 30 mpg fuel economy, this is equivalent to an increase of 1.2~2.1 mpg of Fuel economy improvement.

While the Stop-Start strategy improves fuel economy, it may compromise passenger comfort. Stopping the engine disables the belt-driven A/C system, resulting in interruption of cooling for the passenger compartment. Currently, vehicle OEM's currently rely on the thermal inertia of the air conditioning evaporator to provide some residual cooling during the period when the engine is stopped. The evaporator residual cooling time is typically limited to 25 seconds or less before the discharge temperature of the evaporator rises above a level that no longer provides the desired cooling. When the evaporator is warmed up to a specified air discharge temperature, the engine is restarted to drive the A/C system to provide cooling. This periodic restart under idle conditions undermines average fuel economy that can be achieved by the Hybrid vehicles.

BRIEF DESCRIPTION OF THE INVENTION

According to one aspect of the invention, a method of managing a phase change material (PCM) thermo-syphon evaporator includes the steps of determining the Evaporator Out Air Temperature (EOAT), and determining if the air conditioning (A/C) system is operating in transient cool-down mode or steady state mode, and finally determining the charging priority of the PCM evaporator over that of standard comfort maintenance. If the A/C system is operating in a transient cool-down mode, and PCM charging priority is higher than comfort maintenance, then the HVAC module blower voltage is overridden to a lower value than the standard comfort maintenance blower voltage to achieve a reduced evaporator temperature so as to achieve charging of the PCM material. Conversely, if the A/C system is operating in a steady-state mode, then a predetermined override blower voltage is selected as a function of Evaporator Out Air Temperature only, and a State of Charge Indicator is used to enable or disable the blower override, and consequently, the PCM charging.

These and other features and advantages of this invention will become apparent upon reading the following specification, which, along with the drawings, describes preferred and alternative embodiments of the invention in detail.

BRIEF DESCRIPTION OF DRAWINGS

This invention will be further described, by way of example, with reference to the accompanying drawings in which.

Although the drawings represent embodiments of the present invention, the drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DETAILED DESCRIPTION OF INVENTION

Figure 1:
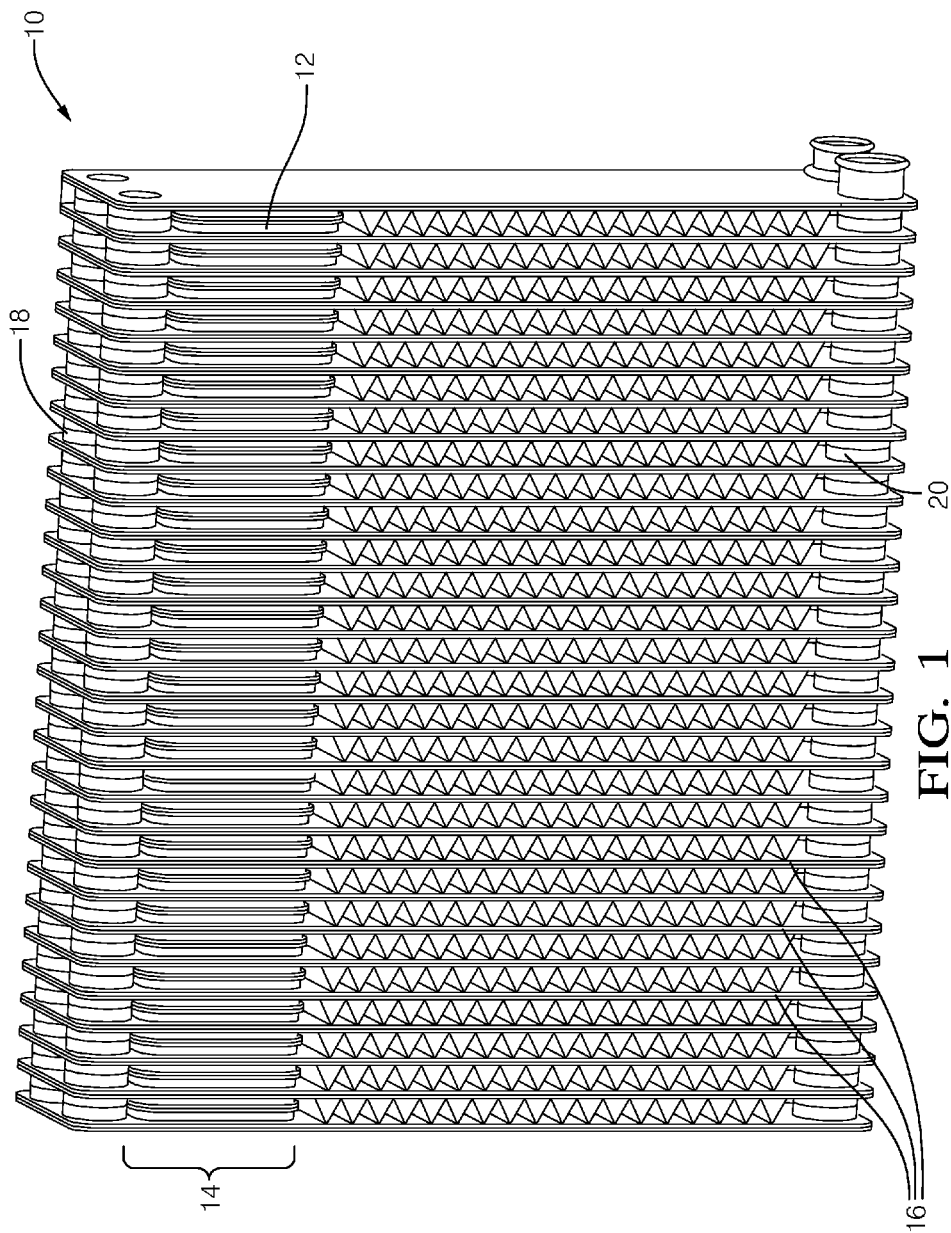
FIG. 1, illustrates a perspective view of a thermo-syphon PCM evaporator employed in the present invention.

To improve Stop-Start hybrid vehicle fuel economy, Phase Changing Materials (PCM) based Thermal Storage technologies have been created to bank the excessive cooling available during road load operations and release the stored cooling during traffic stop to provide passenger comfort. As indicated in FIG. 1, PCM material is typically integrated into the top portion of the evaporator to provide cooling storage capability. Due to the fact that PCM materials' latent heat is significantly greater than their sensible heat, extended period of comfort can be provided to the passenger compartment before an engine restart is needed. The reduction in the frequency of restart, or the entire elimination thereof, during the majority of traffic stops, allows the Stop-Start strategy to achieve its full fuel economy potential.

Referring to FIG. 1, illustrated is a preferred exemplary embodiment of an evaporator 100 having a plurality of PCM housings 12 in thermal communication with the upper region 14 of the refrigerant tubes 16. The evaporator 10 includes an upper manifold 18 and a lower manifold 20, in which the terms upper and lower are used with respect to the direction of gravity. Hydraulically connecting the upper manifold 18 with the lower manifold 20 are flat refrigerant tubes 16 which may be manufactured by any methods known to those of ordinary skill in the art, such as by extrusion, folding of a sheet of heat conductive material, or assembling two half plates having stamped features defining flow spaces. While flat tubes are shown, those of ordinary skill in the art would recognize that other refrigerant tube shapes may be utilized.

Figure 2:
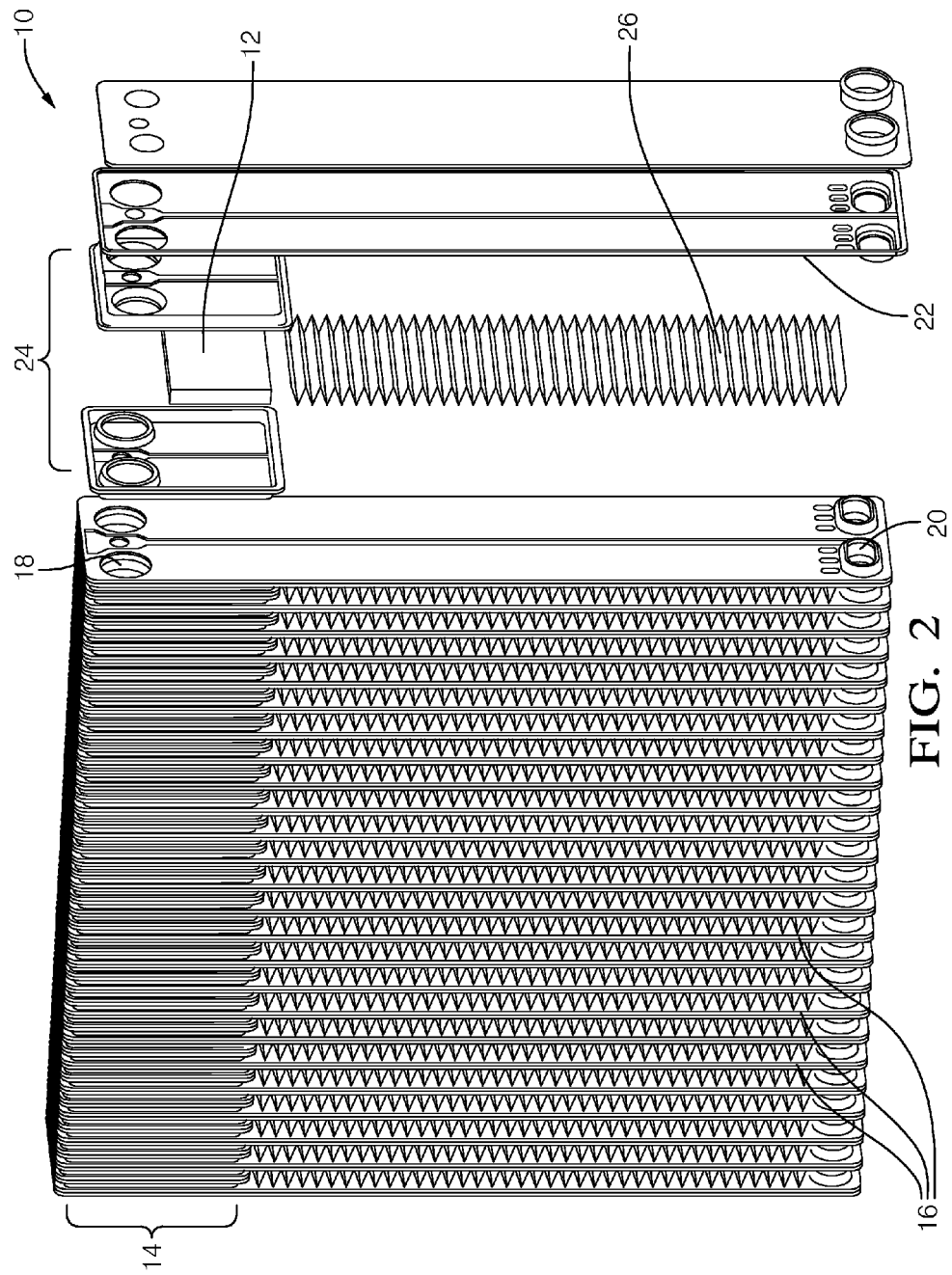
FIG. 2, illustrates an exploded, perspective view of the thermo-syphon PCM evaporator of FIG. 1, depicting internal details thereof.

Referring to FIG. 2, illustrated is a partially exploded view of the evaporator 10, which is manufactured from a plurality stamped metallic plates 22. The stamped metallic plates 22 include features known to those of ordinary skill in the art, such as openings, bosses about selected openings, and flanges. When stacked and brazed, the plurality of stamped metallic plates 22 define the upper manifold 18, lower manifold 20, and flat refrigerant tubes 16 hydraulically connecting the manifolds 18, 20. Inserted between adjacent flat refrigerant tubes 16 is a PCM housing 24 containing a phase change material. The PCM housing 24 may be defined by features on the stacked and brazed stamped metallic plates 22, or may be manufactured separately and then assembled onto the evaporator 10. A PCM housing 24 is disposed between adjacent flat refrigerant tubes 16 and is in thermal contact with only the upper region 14 of the flat refrigerant tubes 16. The PCM housing 24 may surround part of the upper manifold 18 or, as an alternative, the PCM housing 24 may be separate from the upper manifold 18 and positioned in the upper region 14 of the flat refrigerant tubes 16 immediately below the upper manifold 18. A heat conductive material such as metallic fins 12 or metallic particles or fibers may be added in the PCM housing 24 to increase the heat transfer efficiency. Corrugated fins 26 may be inserted between the adjacent flat refrigerant tubes 16 beneath the PCM housing 24.

Figure 3:
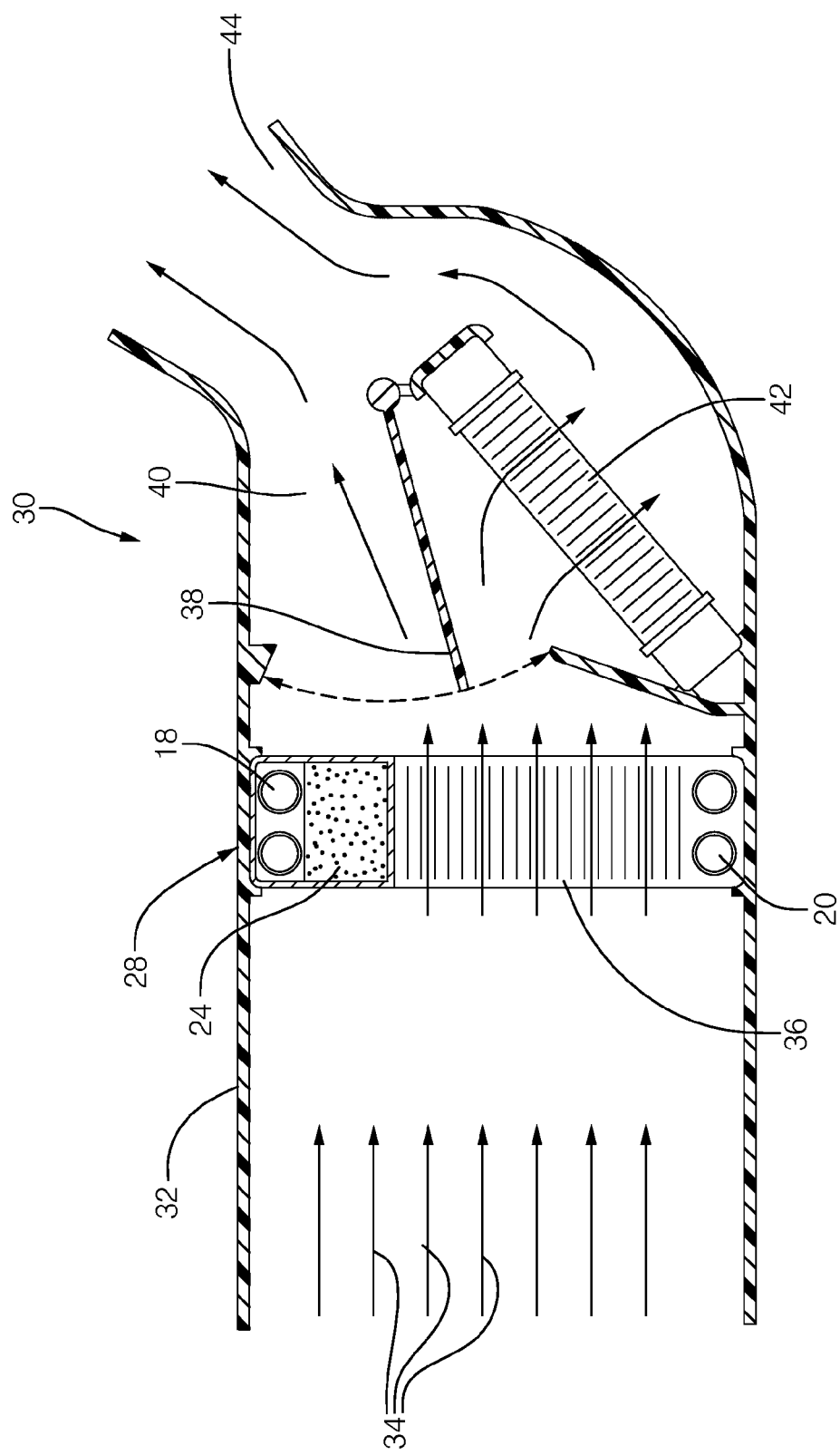
FIG. 3, illustrates the PCM evaporator of FIG. 1, employed within an HVAC module.

FIG. 3 indicates the application of a PCM evaporator 28 in an A/C system HVAC module 30. The PCM evaporator 28 replaces the traditional non-PCM evaporators and becomes an integral part of the A/C system 30. The PCM evaporator 28 is nestingly disposed within an HVAC air flow duct 32 such that air flowing there through, as indicated by arrows 34, passes through the lower portion 36 of the PCM evaporator 28. Airflow exiting the PCM evaporator 28 is selectively directed by a damper door 38 through a bypass passage 40 or a heater core 42 toward an outlet port 44.

Figure 4:
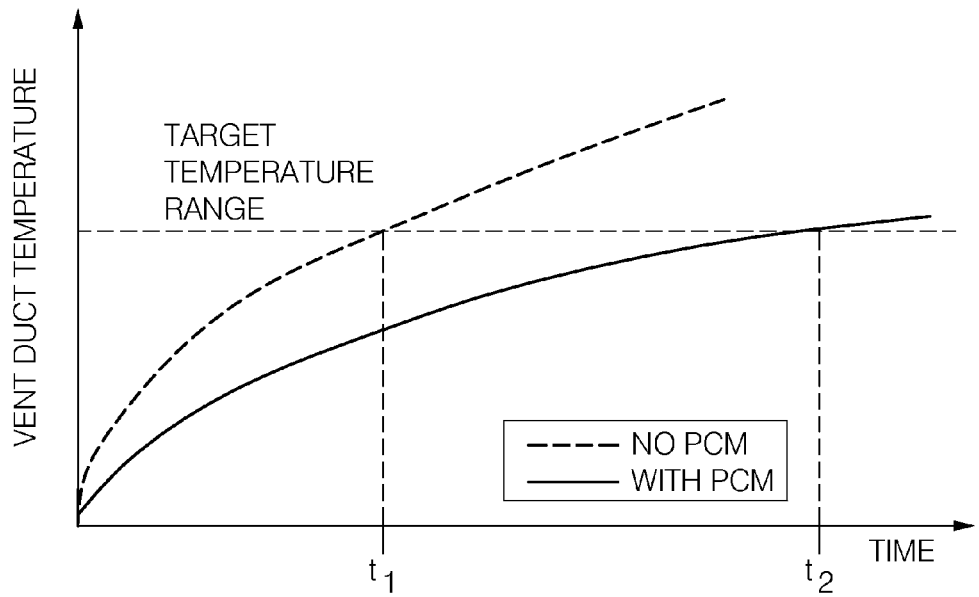
FIG. 4, is a graph illustrating contrasting Vent Duct Temperature v Time characteristics of an HVAC module with and without a PCM evaporator.

FIG. 4 graphically illustrates the impact of the PCM cooling storage in terms of the duration within which a sustained low vent outlet discharge temperature is achieved. Normally, the duration of useful discharge temperature is double or triple of the standard non-PCM equipped evaporators.

An embodiment of the invention focuses on the managed use of the PCM evaporator to achieve maximum fuel economy saving. The direct application of the present invention is on vehicles with automatic climate control systems. However, it is also applicable to enhanced manually controlled A/C systems.

The basis is the definition of a State of Charge Indicator. With the charging status known, it is possible to intelligently manage the charging process to increase the operational availability of the PCM cooling at a traffic stop and achieve improved fuel economy. Meanwhile, it also makes it possible to achieve operational compatibility with the Series Reheat Reduction (SRR) control methodology, allowing Mild Hybrid vehicles to gain the benefit of energy saving from both the PCM and SRR.

State of Charge Indicator

Herein one method of defining the State of Charge Indicator is provided. According to Max Planck (1858~1947, Germany, Nobel Physics Prize Recipient, 1918), the liquid/solid phase change time for pure or homogeneous substances of specific shape with a single freezing/melting temperature can be determined with the following formula, $$t_{100} = \frac{\Delta H_f \rho}{T_{Freeze} - T_\infty}\left(\frac{Pd}{h} + \frac{Rd^2}{k}\right)$$

where
$t_{100}$ Time to achieve 100% phase change (minutes)
$\Delta H_f$ Latent heat of fusion (Btu/lb)
$\rho$ Density: use liquid density for freezing and solid density for melting (1b/ft^3).
$T_{Freeze}$ Freezing temperature of the PCM (° F.)
$T_\infty$ Surrounding medium temperature (° F.)
P, R Shape dependent constants, as given in Table 1
d Characteristic length: thickness of slab or diameter of cylinder or sphere (ft).
h Surrounding medium heat transfer coefficient (Btu/min-ft2-° F.)
k Material thermal conductivity: use solid conductivity for freezing and liquid thermal conductivity for melting

TABLE 1

Shape Dependent Constants for Plank's Equation

| Shape | P | R |
|---|---|---|
| Infinite Slab | ½ | ⅛ |
| Infinite Cylinder | ¼ | 1/16 |
| Sphere | ⅙ | 1/24 |

In the PCM thermo-syphon evaporator environment, the melting or freezing driving temperature is provided by the A/C system refrigerant. Normally there is no direct evaporator refrigerant temperature measurement in the vehicle. Thus the refrigerant temperature may be obtained indirectly. In most vehicles, the Evaporator Out Air Temperature (EOAT) is measured with a thermistor for A/C system control purposes. The EOAT temperature may be used to approximate the refrigerant temperature through the following equation, where C is a calibratible constant to account for the difference between the refrigerant temperature and the EOAT temperature. It is expected that improvement to the above formula may be obtained by those skilled in the art by way of heat transfer and thermodynamic principles.

$$T_\infty = T_{refrig} = T_{eoa} - C$$

During the freeze process, assuming the PCM material is subjected to the refrigerant temperature $T_{refrig}$ for an incremental amount of time $\delta t$, the percentage of PCM material frozen (or charged) can be indicated by $\delta f_p$, $$\delta f_p = \frac{\delta t}{t_{100}} = \frac{\delta t}{\frac{\Delta H_f \rho}{[T_{Freeze} - T_{eoa}(t) - C]}\left(\frac{Pd}{h} + \frac{Rd^2}{k}\right)}$$

Integrating $\delta f_p$ over the time during which the PCM material is exposed to the refrigerant temperature, the total percentage of PCM frozen, or the State of Charge Indicator, can be obtained, $$f_p = \int_0^t \frac{dt}{\frac{\Delta H_f \rho}{[T_{Freeze} - T_{eoa}(t) - C]}\left(\frac{Pd}{h} + \frac{Rd^2}{k}\right)}$$

Since most of the terms in the above equation are constants, and by defining the following constant K, $$K = \frac{1}{\Delta H_f \rho \left(\frac{Pd}{h} + \frac{Rd^2}{k}\right)}$$

the percentage frozen function can be given as below and used as the State of Charge Indicator, $$f_p = K \int_0^t [T_{Freeze} - T_{eoa}(t) - C] dt$$

The following general boundary conditions apply during the integration process,
If $f_p > 1$, $f_p = 1$
If $f_p < 0$, $f_p = 0$
At engine start before a trip begins or at each traffic stop that lasts longer than the maximum capable time of the PCM evaporator, the percentage froze function is initialized to zero, $$f_p = 0$$

PCM Evaporator Initial Charging During Transient Soak and Cool-Down

The A/C system operation may be classified into two phases of operation. When the cabin is soaked to a high in-car temperature before the engine is started, the initial air conditioning objective is to bring the in-car temperature down as quickly as possible to achieve passenger comfort. This is normally classified as the transient A/C control. After the in-car temperature has been brought down to a preset comfort temperature, further A/C system operation is regulated to maintain the in-car comfort. This maintenance phase of the A/C system control is classified as the steady state control phase.

During the transient stage of the Soak and Cool-down, no charging can be obtained when the EOAT is considerably above the PCM freeze temperature. Charging will start when $$T_{eoa}(t) - C < T_{Freeze}$$

the state of charge can be tracked by real-time integrated $f_p$.

At certain point of the transient operation, the PCM charging may be accelerated by overriding the blower to a lower voltage such that the refrigerant temperature falls below $T_{Freeze}$, or, $$T_{eoa}(t) - C << T_{Freeze}$$

The blower voltage override to a lower value helps promote earlier or quicker charging of the PCM evaporator. However, if the priority is for accelerated transient in-car comfort, charging of the PCM evaporator can be delayed or avoided by overriding blower voltage to a higher level than the default setting. At the higher flow rate, the refrigerant temperature will be elevated along with the EOAT temperature, such that $$T_{eoa}(t) - C > T_{Freeze}$$

When this condition is met with control, it ensures that no charging of PCM will occur and the highest amount of cooling enthalpy will be delivered to the passenger compartment.

Figure 5:
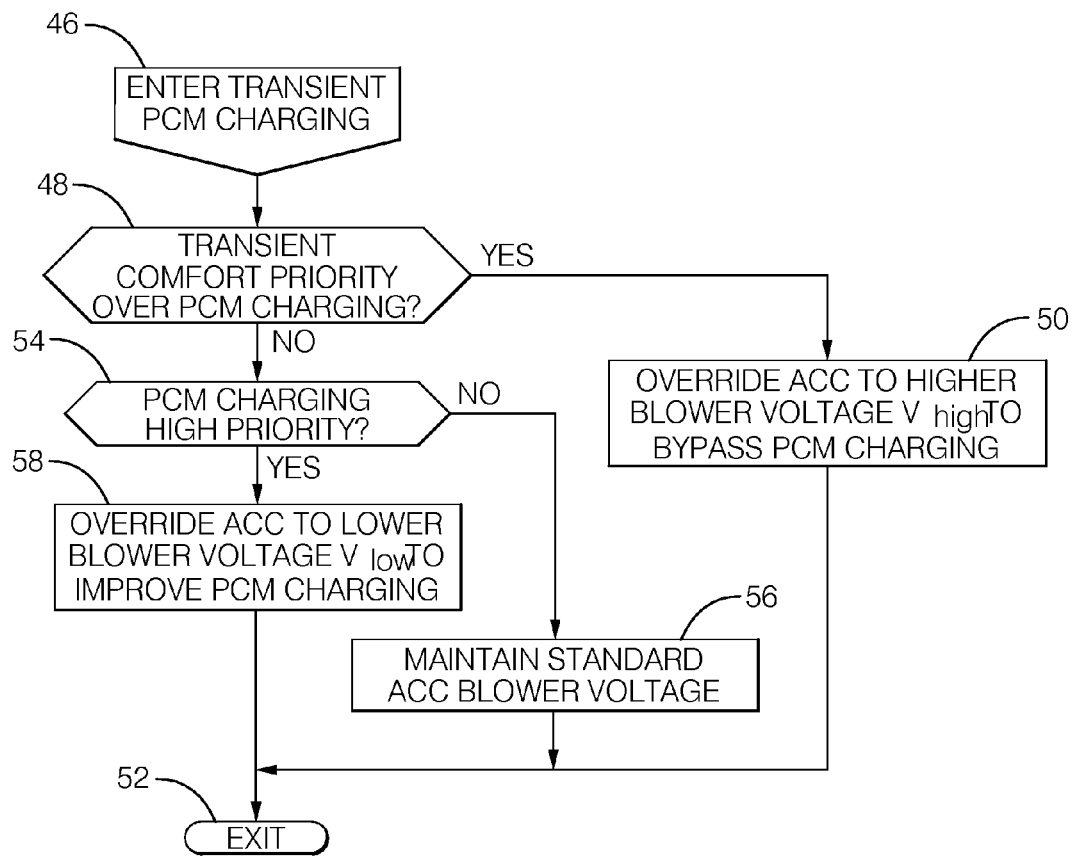
FIG. 5, illustrates a flow chart for managing the PCM charging during A/C transient operation.

FIG. 5 provides the flowchart for managing the PCM evaporator charging during the transient phase of the A/C system operation. The flowchart commences with entering transient PCM charging at step 46, which flows to logic step 48. If the transient comfort has priority over PCM charging, flow passes to step 50 providing override to higher blower voltage Vhigh to bypass PCM charging, and passes on to exit step 52. If the transient comfort does not have priority over PCM charging, flow passes to logic step 54. If PCM charging does not have high priority, flow passes to step 56, where normal ACC system prevails, and passes on to exit step 52. If PCM charging has high priority, it flows to the step 58 of overriding ACC to lower blower voltage Vlow to improve PCM charging, and passes to exit step 52.

PCM Evaporator Charging Under Steady State Conditions

For systems without Series Reheat Reduction (SRR), and under low to mid ambient temperatures, the refrigerant temperature may be naturally below the freezing temperature of PCM, and meeting the condition of, $$T_{eoa}(t) < T_{Freeze} + C$$

then charging will automatically occur. The State of Charge is tracked with $f_p$. Once charged, the PCM evaporator will remain charged and ready to be discharged at traffic stop.

However, if under steady state operating conditions, the refrigerant temperature is above the freeze temperature of PCM, such as when the car is operating in relatively high ambient temperatures (>30° C., e.g.), charging of PCM, if desired, can be accomplished by reducing the blower voltage below that commanded by the ACC system. Under the reduced blower voltage, lower refrigerant temperature may be obtained and hopefully below the PCM freeze temperature. The in-car comfort will be compromised to a limited extent, since at the reduced airflow rate the outlet discharge temperature will also be lowered. For such relatively high ambient temperatures, the override state may need to be maintained over time to ensure the readiness of the PCM evaporator for discharging.

One alternative is to allow certain amount of discharge to the PCM during steady state operation. For example, a minimum capacity of PCM is maintained at 75%. Whenever charging reaches 100%, as indicated by $f_p$, the override state is terminated and the Automatic Climate Control (ACC) system may return to normal operation. Discharge of PCM will occur under the normal operating condition. Once the threshold condition of 75% is reached, charging may be resumed by overriding the blower again.

Under even higher ambient conditions (>=40 C, e.g.), PCM charging temperature may be difficult to reach under the minimum allowable blower voltage. Under these conditions, the engine should not be turned off at the traffic stop for fuel saving purposes. Instead, the engine should remain on for comfort maintenance.

Figure 6:
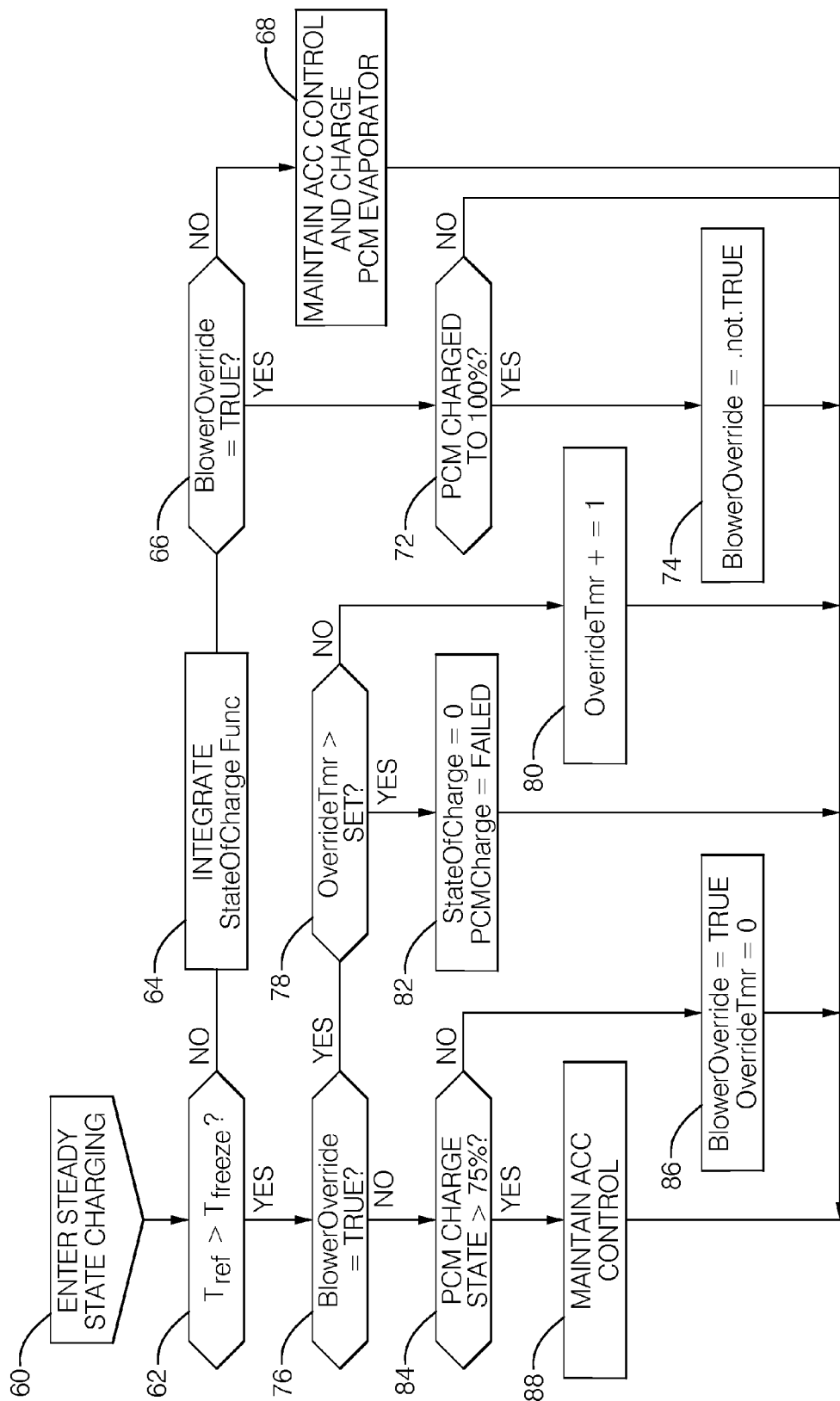
FIG. 6, illustrates a flow chart for monitoring and managing the steady state charging of the PCM evaporator of FIG. 1, FIG. 7, is a graph illustrating PCM Charge State (%) Control Set Point (Deg. C) v Time showing the cyclic charging of a PCM evaporator during Series Reheat Reduction (SSR) operation.

FIG. 6 shows the flowchart for monitoring and managing the steady state charging of the PCM evaporator. During steady state A/C system operation where cabin comfort has been achieved, natural charging is maintained. The rest of the branch manages the cyclic charging of the evaporator by blower override. In the event charging fails to occur after certain amount of time with the blower overridden, a failure to charge signal is provided to engine control to prevent engine from stopping during traffic stop.

The flowchart of FIG. 6 commences with entering steady state charging at step 60, and flows to a logic step 62 determining if Tref exceeds Tfreeze. If Tref does not exceed Tfreeze, the State of Charge Function is integrated at step 64 and then flows to logic step 66. In logic step 66, if Blower Override is not true, the ACC control is maintained and PCM evaporator is charged at step 68, and then flows to exit step 70. Alternatively, if Blower Override is true, PMC charge state is determined at logic step 72. If the PCM is not charged to 100%, flow is direct to exit step 70 with no action taken. If the PCM is charged to 100%, flow is to step 70 wherein Blower-Override flag is set to not true and then to exit step 70. This disables the blower override. If Tref exceeds Tfreeze, flow is to a logic step 76 where Blower-Override state is evaluated. If Blower-Override is true, logic flow is to logic step 78 which determines if Override-Tmr has reached a calibrated set value. If Override-Tmr has not reached the set value, Override-Tmr+ is incremented by 1 at step 80 and logic flows to exit step 70. If Override-Tmr has reached the set value, the State of Charge is assigned 0 and the PCM Charge is assigned to Failed at step 82 and logic flows to exit step 70. If Blower Override is not true, logic flow is to a logic step 84 wherein if PCM Charge does not exceed 75%, logic flow is to step 86 setting Blower-Override=True and Override-Tmr=0 to initiate the blower override and start the timing of the override, and then to exit step 70. Finally, if PCM Charge State exceeds 75%, logic flow is to Maintain ACC Control at step 88 and then to exit step 70.

SRR Compatible PCM Evaporator Charging Under Steady State Conditions

For vehicle A/C systems with Series Reheat Reduction (SRR), the normal operating EOAT temperature may be above the freeze temperature of the PCM for ambient temperatures in the range of 5~30 C. Typical EOAT temperature under SRR is around 10° C. This may make the steady state charging and maintenance of the PCM evaporator impossible due to that the melting temperature of the PCM is lower than the SRR set temperature. However, by taking advantage of the thermal inertia of the PCM evaporator and that of the airflow ducts, compatibility of SRR with PCM evaporator can be achieved.

Figure 7:
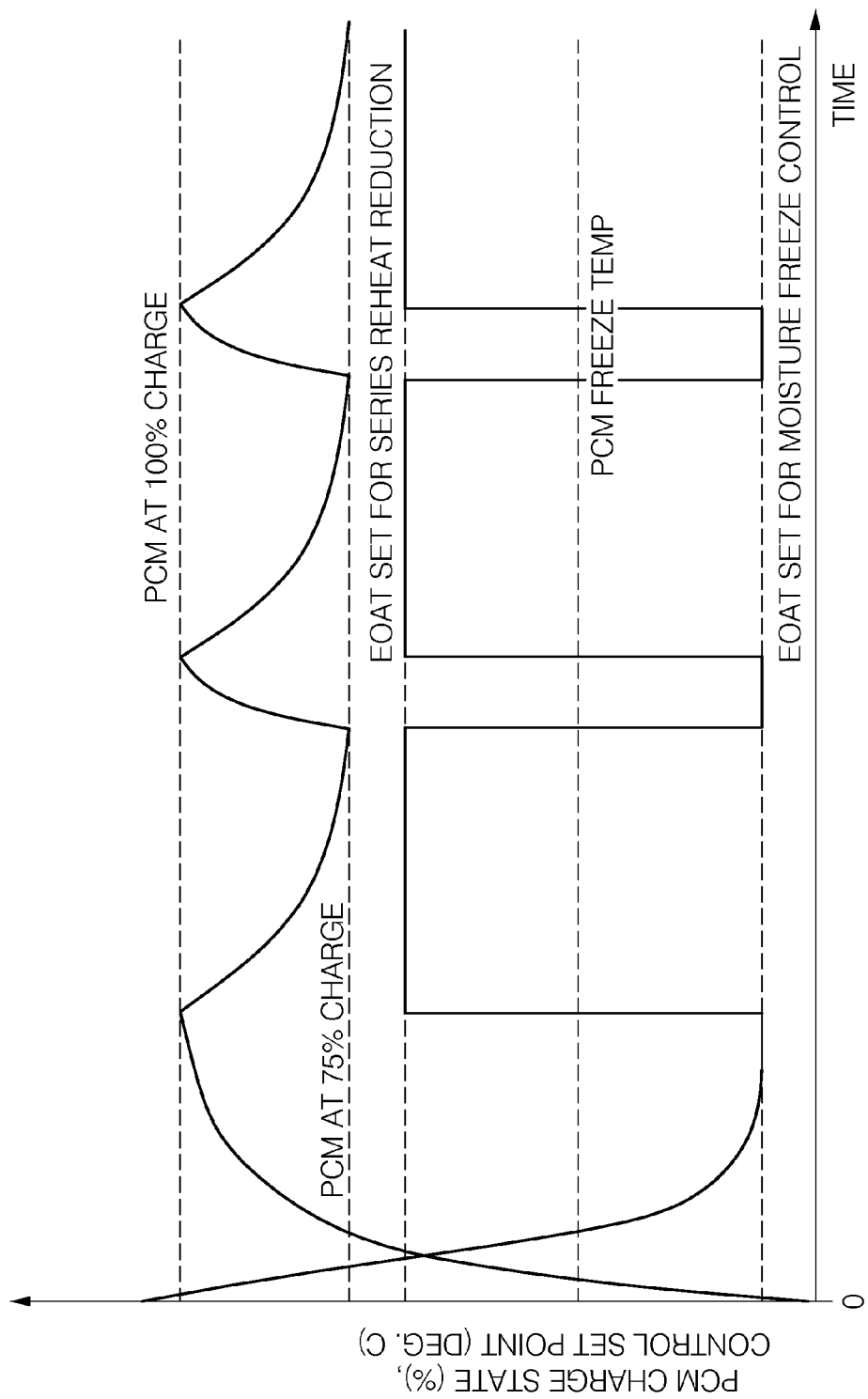

As shown in FIG. 7, the initial charging of the PCM evaporator is performed by overriding the SRR control to moisture freeze control EOAT temperature. Once charged and the State of Charge indicator is at 100%, the SRR control is executed to achieve improved A/C system energy efficiency. For the maintenance of the PCM evaporator, the SRR control is periodically overridden to maintain the charging state. For example, with the SRR EOAT control at 10° C. and the PCM freeze point at 5° C., the SRR operation may slowly discharge the PCM evaporator since the refrigerant temperature maybe higher than the PCM freeze point. At a pre-established State of Charge indicator level, such as 75% (defined to be the minimum required capacity level for Start Stop operation), the SRR will be overridden to evaporator freeze control for lowered refrigerant temperature to charge the PCM. For charging from 75% to 100%, the estimated charging time is about 25 seconds. Due to the thermal inertia of the evaporator, the air steam will likely not sense the temperature change during that period. Once the PCM charging indicator arrives at the 100% state, the SRR control assumes normal control of the A/C system. During the SRR high EOAT control period (such as 10° C.), the stored cooling in the PCM evaporator gradually gets discharged. This automatically translates into further reduced compressor load and result in additional energy saving more than that from the SRR algorithm alone. On average over the cycle, the extra energy used to charge the PCM in the SRR overriding period is balanced by the energy saving from the PCM evaporator during its discharge period. The net effect is that the PCM evaporator is at least maintained at 75% (as an example), and the SRR still achieves its own design objective.

Figure 8:
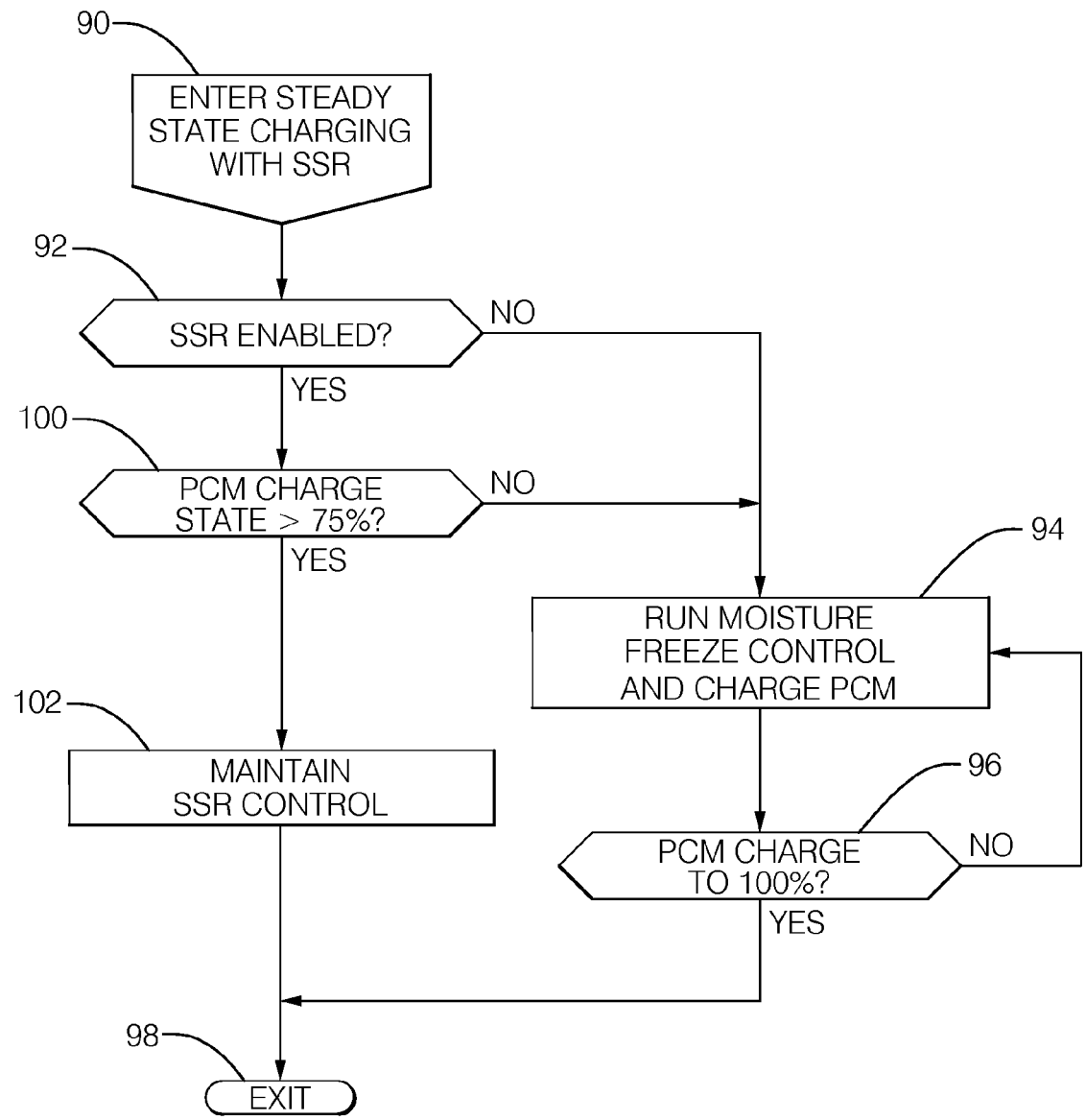
FIG. 8, illustrates a flow chart of an SSR compatible charging algorithm.

FIG. 8 shows the flowchart for the SRR compatible PCM charging algorithm. In the event that the EOAT temperature decreases before the charging reaches 100%, charging of the PCM evaporator may be stopped early. For example, EOAT starts to decrease when PCM reaches 90%. The overall impact is that the charging and discharging will occur between 75% and 90%, and the cycling frequency for SRR override is in general increased.

The flow chart commences with entering steady state charging with SSR at step 90 and flowing to logic step 92 which determines if SSR is enabled. If SSR is not enabled, logic flows to step 94 which runs moisture freeze control and charge PCM. Logic then flows to a logic step 96 which determines if PCM is charged to 100%. If PCM is charged to 100%, logic flows to an exit step 98. If PCM is not charged to 100%, logic feeds back to step 94 to re-run moisture freeze control and charge PCM. If the SSR is enabled at logic step 92, logic flows to a logic step 100 which determines if PCM Charge State exceeds 75%. If PCM Charge State does not exceed 75%, logic flow returns to the input of step 94. If PCM Charge State exceeds 75%, logic flow continues to step 102 which maintains SSR control and subsequently flows to exit step 98.

The SRR overriding control can be further improved by monitoring the Discharge Air Temperature (DAT) sensor for cars equipped with such sensors. The charging of the PCM evaporator can be carried on until the DAT sensor senses the first sign of decrease in the discharge air temperature (such as 0.5 C decrease in discharge temperature decrease). Immediately afterwards the SRR control is resumed. The PCM State of Charge indicator is monitored. When it becomes 75%, or some other predefined value, the charging of the PCM evaporator should be initiated again. This is carried out periodically over time. The advantage of this method is that the thermal inertia of the air ducts is utilized to perhaps allow more charging time without impacting the discharge temperature commanded by the ACC system.

Another consideration in charging the PCM evaporator is City Traffic driving. A timer may be maintained between two consecutive stops and a record of the driving intervals is kept. As the frequency of the stops increases beyond certain point, a judgment is made that the car is driving in the city traffic. It is expected that more energy can be saved via stopping the engine than with the SRR. At this point, PCM charging will gradually take a higher priority than SRR. This is implemented algorithmically by reducing the set point of the SRR toward evaporator moisture freeze control.

While this invention has been described in terms of the preferred embodiments thereof, it is not intended to be so limited, but rather only to the extent set forth in the claims that follow.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the Having described the invention, it is claimed:

1. A method of controlling an air conditioning system (A/C system) including phase change material (PCM) thermo-syphon evaporator, a compressor, and a blower, the method comprising the steps of:
   measuring an evaporator out air temperature and generating a State of Charge Indicator control signal as a function thereof;
   determining if the A/C system is operating in a transient cool-down mode or a steady-state mode and generating an A/C operating mode signal as a function thereof;
   determining a PCM thermo-syphon evaporator charging priority;
   selecting a first predetermined blower voltage that is lower than a transient comfort blower, voltage when the PCM thermo-syphon evaporator charging priority is higher than a comfort maintenance priority to achieve PCM charging,
   selecting a second predetermined blower voltage as a function of the State of Charge Indicator control signal, the second predetermined blower voltage being lower than a steady state comfort blower, voltage when the A/C system is operating in the steady-state mode and a blower voltage override is determined to be necessary, wherein the first predetermined blower voltage is different from the second predetermined blower voltage; and
   operating the blower at the selected predetermined blower voltage.

2. The method of claim 1:
   wherein the State of Charge Indicator control signal is calculated by integrating over time the difference between an estimated refrigerant temperature using the measured evaporator out air to form an integrated value;
   further comprising the step of temperature and a PCM phase freeze temperature; and
   applying a calibratable factor to the integrated value so that the State of Charge Indicator control signal provides a percentage of PCM charged.

3. The method of claim 2, further comprising the steps of:
   initializing the State of Charge Indicator control signal to zero after a prolonged calibratable period of A/C off time; and
   truncating the State of Charge Indicator control signal to the value of 1 (100%) when the integrated value is greater than 1 (100%).

4. The method of claim 1, further comprising the steps of:
   controlling the compressor to provide a low evaporator out air temperature satisfying an evaporator freeze prevention requirement and to simultaneously charge the PCM evaporator;
   raising the compressor control set point to a higher, calibratable temperature, to reduce compressor load and achieve increased energy efficiency when the State of Charge Indicator control signal indicates full charge; and
   establishing a calibratable lower PCM charge threshold using the State of Charge control signal Indicator, and when the State of Charge Indicator control signal falls below an established lower PCM charge threshold, operating the compressor to a reduced set point intended for evaporator freeze prevention.

5. The method of claim 4:
   wherein the State of Charge Indicator control signal is calculated by integrating over time the difference between an estimated refrigerant temperature using the measured evaporator out air to form an integrated value;
   further comprising the step of temperature and a PCM phase freeze temperature; and
   applying a calibratable factor to the integrated value so that the State of Charge Indicator control signal provides a percentage of PCM charged.

6. The method of claim 5, further comprising the steps of:
   initializing the State of Charge Indicator control signal to zero after a prolonged calibratable period of A/C off time; and
   truncating the State of Charge Indicator control signal to the value of 1 (100%) when the integrated value is greater than 1 (100%).

7. A method of controlling an air conditioning system (A/C system) including a phase change material (PCM) thermo-syphon evaporator, a compressor, and a blower, the method comprising the steps of:
   measuring an evaporator out air temperature and generating a State of Charge Indicator control signal as a function thereof;
   determining if the A/C system is operating in a transient cool-down mode or a steady-state mode and generating an A/C operating mode signal as a function thereof;
   determining a PCM thermo-syphon evaporator charging priority;
   selecting a first predetermined blower voltage that is lower than a transient comfort control blower voltage, when the PCM thermo-syphon evaporator charging priority is higher than a comfort maintenance priority to achieve PCM charging,
   selecting a second predetermined blower voltage as a function of the State of Charge Indicator control signal, the second predetermined blower voltage being lower than a steady state comfort blower voltage, when the A/C system is operating in the steady-state mode and a blower voltage override is determined to be necessary; and
   operating the blower at the selected predetermined blower voltage further comprising the steps of:
   measuring an ambient temperature and comparing the measured ambient temperature with two predetermined, calibratable temperature thresholds to assign the A/C to one of three temperature zones, which are a low ambient temperature zone, in which the PCM is naturally charged; a medium ambient temperature zone, in which the PCM may be charged by blower voltage override; and a high ambient temperature zone, in which PCM charging is impossible; and
   overriding the steady state comfort blower voltage in the second ambient temperature zone to achieve PCM charging.

8. The method of claim 7, further comprising the step of:
   establishing a State of Charge Indicator threshold to manage the blower override when the State of Charge Indicator control signal is below the State of Charge Indicator threshold,
   initiating the blower override when the State of Charge Indicator control signal is below the State of Charge Indicator threshold, and turning off the blower override when the State of Charge Indicator control signal indicates 100% charge.

* * * * *